Jan. 15 1925.  W. R. HILDEBRAND  1,987,936
HEATING DEVICE
Filed June 26, 1933
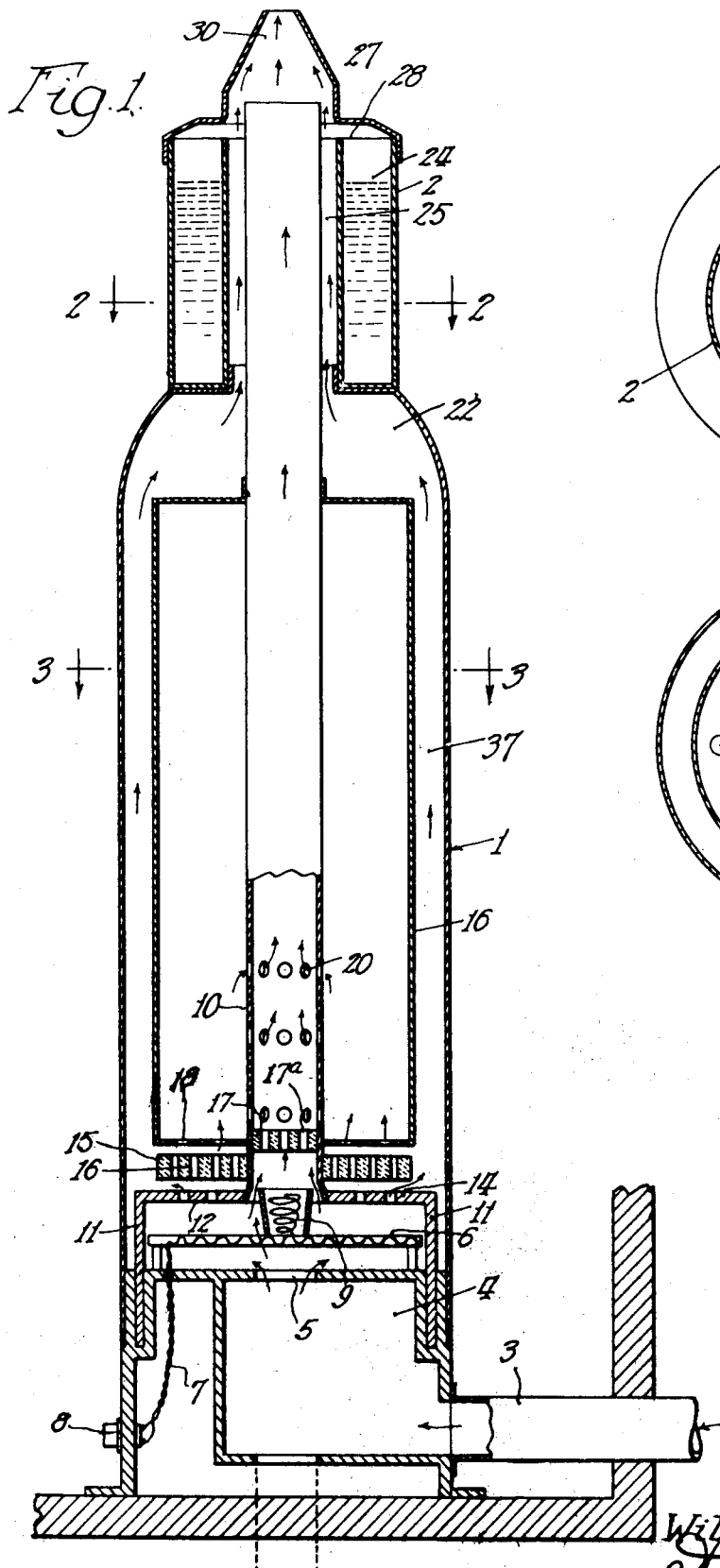
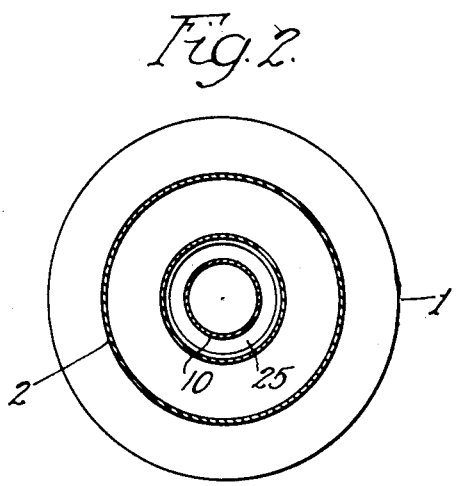
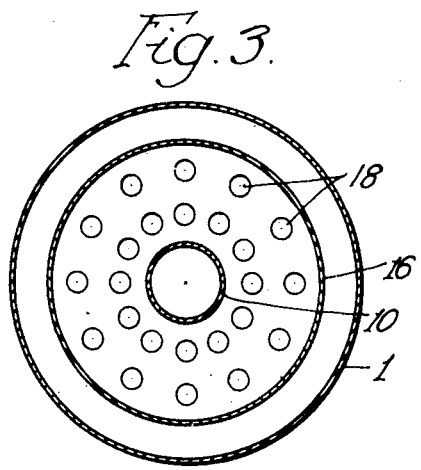
Inventor
William R. Hildebrand Patented Jan. 15, 1935

1,987,936

UNITED STATES PATENT OFFICE 1,987,936

HEATING DEVICE

William R. Hildebrand, Chicago, Ill.

Application June 26, 1933, Serial No. 677,622

19 Claims. (Cl. 219—38)

My invention relates to heating devices, particularly for use for heating houses and the like.

One of the objects of the invention is to provide a simple, practical and effective form of heating device.

Another object of the invention is to secure good circulation of air in the room or space where the heater is being used.

Another object of the invention is to secure humidification of the air.

Another object of the invention is to secure simplicity and effectiveness of construction with low expense of manufacture.

Other objects of the invention will appear and be pointed out hereinafter.

In the accompanying drawing—

Fig. 1 is a vertical section of the heating device embodying my present invention; and Figs. 2 and 3 are cross sections taken on lines 2—2 and 3—3, respectively, of Fig. 1.

Referring to the drawing, I show a heating device preferably comprising a main outer shell or casing 1 and a supplemental or upper shell or casing 2 preferably mounted on the casing 1.

At the lower end of casing 1 I preferably provide an air inlet 3 which opens into an air chamber 4 having an upper outlet 5 to admit escape of air upwardly into the heating device. Preferably air inlet 3 communicates with outside air, so as to supply fresh air to the heater.

A heating unit 6 is preferably provided above the outlet 5 so that unit 6 really serves as a baffle plate for air issuing through the outlet opening 5. This heating unit may be any preferred type of electric heater, preferably a resistance coil the ends of which 7 are preferably connected to a terminal 8 at one side of the casing forming the bottom of the heating element.

Heated air passes through unit 6 and around projection 9 and some of it passes into lower end of tube 10 and some passes through apertures 14 in plate 12. A wall or partition 15 is arranged above plate 12 and provided with apertures 16 through which air may pass from apertures 14. Some air from apertures 12, however, passing outwardly between members 12 and 15. Another partition 17 with apertures 17a is provided in lower end of tube 10. Members 15 and 17 are preferably made of incombustible material, such as earthenware or carbon composition. Plate 12 is preferably supported by and made integral with side members 11, 11.

Above members 15 and 17 is an inner casing 16 which fits within the outer casing 1 with a space or chamber 37 between the casings 16 and 1, said casing 16 surrounding tube or conduit 10. The bottom of this casing 16 is preferably provided with apertures 18 for the passage of air from apertures 16. Conduit 10 preferably is provided with apertures 20 above partition 17, but preferably only in lower part of said tube 10 as shown.

Casing 16 thus preferably provides a hot air pocket, the heated air accumulating in its upper portion and serving as a supplemental heating device for air passing through tube 10 and chamber 37.

Upper casing 2 preferably is a water container of hollow annular form, providing an annular water receptacle 24 surrounding a central recess 25. Top of casing 2 is preferably provided with apertures 27 to permit escape of heated air and is preferably provided with a chimney 30 for the further escape of heated air. The top of annular water chamber 24 is preferably left open as at 28, so as to permit heated air passing through central aperture 25 to draw vapor from water container 24 and thus become humidified.

Thus it will be seen that air may enter through inlet 3 and if desired this may be fresh air, drawn from outside the room or compartment containing the device. The air is first heated by unit 6 and then circulated slowly through members 15 and 17, being thus retarded so as to increase the heating effect. Some air passes outwardly above plate 12 and into chamber 37, then passes upwardly through tube 10 and chamber 17, being further heated by air pocket or heater 16. Thus great efficiency is secured, with simplicity of construction.

It will be understood that changes and modifications may be made without departing from the spirit of the invention.

What I claim is:

1. A device of the class specified having inner and outer casings, a heating device in the lower portion of the outer casing and below the inner casing, means for conveying heated air from the heating device to the space between the casings and also for conveying it into the inner casing and retaining it there and also conveying other heated air through the inner casing.

2. A device of the class specified having inner and outer casings, a heating device in the lower portion of the outer casing and below the inner casing, means for conveying heated air from the heating device to the space between the casings and also for conveying it into the inner casing and retaining it there and also conveying other heated air through the inner casing, and a humidifier above said casings.

3. A device of the class specified having inner and outer casings, a heating device in the lower portion of the outer casing and below the inner casing, means for conveying heated air from said heater to the space between the casings, a central tube in the inner casing, means for conveying air from the heating device to said central tube, said tube having its lower end only provided with apertures opening into the inner casing, and means for discharging air for service from said tube.

4. A device of the class specified having inner and outer casings, a heating device in the lower portion of the outer casing and below the inner casing, means for conveying heated air from said heater to the space between the casings, a central tube in the inner casing, means for conveying air from the heating device to said central tube, said tube having its lower end only provided with apertures opening into the inner casing, means for discharging air for service from said tube, and a humidifier mounted above the outer casing and receiving the upper end of said tube and having a chimney for the discharge of heated air.

5. In a device of the class specified, a combination with the inner and outer casings of a heating device below the inner casing and members havng passages or apertures to permit the air to pass from the heating device to the inner casing but to retard the free flow of the same, a tube in the inner casing arranged to receive air from the heating device, and a member arranged in the lower end of the inner tube and having apertures or orifices to permit a restricted flow of air to the inner tube.

6. A device of the class specified comprising vertically arranged tubular members forming upwardly extending air passages, said members having openings at their upper ends for the escape of heated air, a heating device below said members with passages from the heating device to the interiors of said members to allow heated air to enter said members and travel upwardly therein and be discharged from their upper ends, and baffle members at the lower ends of said tubular members providing baffle devices to retard the flow of heated air into said tubular member.

7. A device of the class specified comprising upwardly extending tubular members providing upwardly extending passages for heated air, one of said members having its upper end closed and outlets near its lower end, and a heating device at the lower ends of said tubular members with passages to permit the flow of air from the heating device into said tubular members.

8. A device of the class specified comprising upwardly extending tubular members one of which has its upper end open and one of which has its upper end closed, a heating device below said members, the lower ends of both members being open to air from the heating device, and the member whose upper end is closed being provided with escape orifices near its lower end.

9. A device of the class specified comprising upwardly extending tubular members one of which has its upper end open and one of which has its upper end closed, a heating device below said members, the lower ends of both members being open to air from the heating device, the member whose upper end is closed being provided with escape orifices near its lower end, and an inlet for outside air arranged to supply outside air to said heating device.

10. A device of the class specified comprising upwardly extending tubular members one of which has its upper end open and one of which has its upper end closed, a heating device below said members, the lower ends of both members being open to air from the heating device, the member whose upper end is closed being provided with escape orifices near its lower end, and an inlet for outside air arranged to supply outside air to said heating device, said outside air inlet being arranged to open into the device below the heating device.

11. A device of the class specified comprising a tubular member providing an upwardly extending passage for heated air, a heating device below said tubular member arranged to supply heated air to said tubular member, and an inlet for outside air opening into the device below the heating device, the latter being adapted and arranged to permit outside air entering below it to become heated and then rise and enter said tubular member.

12. A device of the class specified comprising vertically arranged inner and outer drums or casings, the inner drum or casing being sufficiently smaller than the outer one to provide an upwardly extending passage between it and the outer one, said drums or casings having air inlets substantially at their lower ends, a heating device below the air inlets of said drums or casings arranged to supply heated air to said inlets, and an inlet passage for outside air opening below said heating device and supplying outside air to the same.

13. A device of the class specified comprising vertically arranged inner and outer drums or casings, the inner drum or casing being sufficiently smaller than the outer one to provide an upwardly extending passage between it and the outer one, said drums or casings having air inlets substantially at their lower ends, a heating device below the air inlets of said drums or casings arranged to supply heated air to said inlets, an inlet passage for outside air opening below said heating device and supplying outside air to the same, and baffle members for retarding the flow of heated outside air to said drums or casings.

14. A device of the class specified comprising vertically arranged inner and outer drums or casings, the inner drum or casing being sufficiently smaller than the outer one to provide an upwardly extending passage between it and the outer one, said drums or casings having air inlets substantially at their lower ends, a heating device below the air inlets of said drums or casings arranged to supply heated air to said inlets, an inlet passage for outside air opening below said heating device and supplying outside air to the same, and a central tubular member passing upwardly through the inner drum or casing and having openings in its lower end to receive heated air from the heating device and also having openings to receive heated air from the inner drum.

15. A device of the class specified comprising vertically arranged inner and outer drums or casings, the inner drum or casing being sufficiently smaller than the outer one to provide an upwardly extending pasage between it and the outer one, said drums or casings having air inlets substantially at their lower ends, a heating device below the air inlets of said drums or casings arranged to supply heated air to said inlets, an inlet passage for outside air opening below said heating device and supplying outside air to the same, and a central tubular member passing upwardly through the inner drum or casing and having openings in its lower end to receive heated air from the heating device and also having openings to receive heated air from the inner drum, said inner drum having its upper end closed to force heated air downward to and through the openings into the central tubular member.

16. A device of the class specified comprising vertically arranged inner and outer drums or casings, the inner drum or casing being sufficiently smaller than the outer one to provide an upwardly extending passage between it and the outer one, said drums or casings having air inlets substantially at their lower ends, a heating device below the air inlets of said drums or casings arranged to supply heated air to said inlets, an inlet passage for outside air opening below said heating device and supplying outside air to the same, a central tubular member passing upwardly through the inner drum or casing and having openings in its lower end to receive heated air from the heating device and also having openings to receve heated air from the inner drum, said inner drum having its upper end closed to force heated air downward to and through the openings into the central tubular member, and a moistening device comprising an annular member arranged to surround the upper end of the central tubular member and also to form an outlet from the outer drum or casing so that air from all tubular members may pass through the center of said annular moistening member and be moistened thereby.

17. A device of the class specified comprising inner and outer vertically arranged drums or casings open at their lower ends to receive heated air, a central tubular member extending upwardly in the inner drum or casing and also having apertures for heated air at its lower end, and a heating device located below the open lower ends of said drums and central tubular member and arranged to extend from side to side substantially across the same.

18. A device of the class specified comprising inner and outer vertically arranged drums or casings open at their lower ends to receive heated air, a central tubular member extending upwardly in the inner drum or casing and also having apertures for heated air at its lower end, and a heating device located below the open lower ends of said drums and central tubular member and arranged to extend from side to side substantially across the same, said heating device having a central portion for additional heating effect underneath the open lower end of the central tubular member.

19. A device of the class specified comprising inner and outer vertically arranged drums or casings open at their lower ends to receive heated air, a central tubular member extending upwardly in the inner drum or casing and also having apertures for heated air at its lower end, a heating device located below the open lower ends of said drums and central tubular member and arranged to extend from side to side substantially across the same, said heating device having a central portion for additional heating effect underneath the open lower end of the central tubular member, and baffle members at the lower ends of said drums and tubular member for retarding the flow of heated air and spreading the same.

WILLIAM R. HILDEBRAND.